M. G. FRIES.
INTAKE VALVE FOR INJECTORS.
APPLICATION FILED JAN. 10, 1911.
1,047,195.
Patented Dec. 17, 1912.
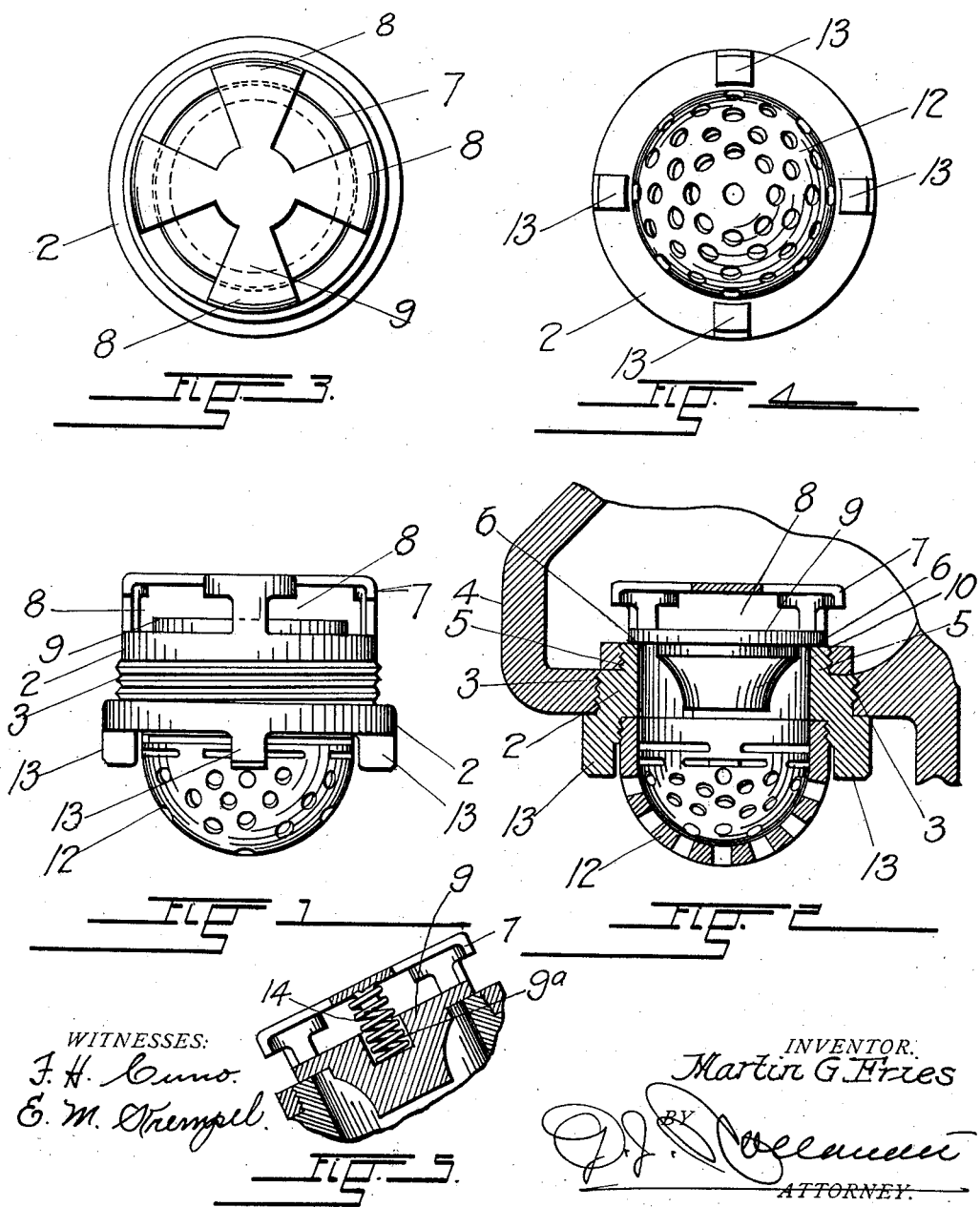

UNITED STATES PATENT OFFICE.

MARTIN G. FRIES, OF DENVER, COLORADO, ASSIGNOR OF ONE-HALF TO LEWIS W. BURCHARD, OF DENVER, COLORADO.

INTAKE-VALVE FOR INJECTORS.

1,047,195.  Specification of Letters Patent.  Patented Dec. 17, 1912.

Application filed January 10, 1911. Serial No. 601,792.

*To all whom it may concern:*

Be it known that I, MARTIN G. FRIES, a citizen of the United States of America, residing at Denver, in the county of Denver and State of Colorado, have invented certain new and useful Improvements in Intake-Valves for Injectors, of which the following is a specification.

This invention relates to new and useful improvements in check valves and more particularly in valves of the type employed in connection with injectors, to prevent the return flow of the fluid admitted thereinto.

The so-called intake valves of injectors at present in use, consist, ordinarily, of a disk, the stem of which it fitted in a sleeve on the valve-housing, and provided at its extremity with a transversely applied split pin or cotter to prevent excessive movement of the valve. Valves thus constructed are often the cause of the injector being rendered inoperative, either by adherence of the valve stem to the sleeve in which it is fitted, by lodging of obstructions between the valve and its seat, by breakage of the stem when corroded or by loosening of the pin or cotter.

The object of the present invention resides in the provision of a stemless valve which has a free limited movement in a ported cage and which is protected against the detrimental influence of obstructive solid matter, by a strainer which separates the solids from the fluid before it flows past the valve.

An embodiment of my invention is illustrated in the accompanying drawings in the various views of which like parts are similarly designated, and in which—
Figure 1 represents a side elevation of the improved valve. Fig. 2, a vertical, central section of the same in position on the body of an injector, Fig. 3, a top view of the valve, Fig. 4, an underneath view of the same, and Fig. 5, a sectional view of a modified construction of the valve.

Referring to the drawings by numerals, 2 designates the annular body portion of the valve housing which is formed upon its circumference, with a screw thread 3, by means of which the device is secured to the body 4 of an injector as is shown in Fig. 2 of the drawings. An upwardly projecting, externally threaded rim 5 on the body 2 of reduced exterior diameter, provides at once a seat 6 for the valve and a means for the attachment of a cylindrical valve cage 7 which is formed interiorly with a screw thread to be presented in operative relation to the exterior thread of the rim 5. The cage 7 has in its circumferential wall, a plurality of ports 8 through which the fluid flowing past the valve, is admitted into the adjacent passage of the injector, and these ports may, for lightness in construction, be extended into the flat top portion of the cage, which in the operation, serves as a stop to limit the upward movement of the valve.

The valve which in the drawings, is designated by the numeral 9, consists of a disk which being loosely fitted within the cage 7, normally engages the seat 6 formed by the edge of the rim 5, and which is, usually, provided with a central enlargement 10 which serves to maintain the valve in a level position during its movement from and toward the seat.

The portion of the body member 2 of the housing, opposite to the rim 5, is provided interiorly with a screw thread for the attachment of a correspondingly threaded strainer 12, which consists of a substantially semi-spherical cup having a multiplicity of perforations through which the fluid enters the valve housing and by which solid matter associated with the said fluid, is separated therefrom before it passes by the valve.

While I have shown the strainer as being made separate and detachable from the body portion 2 of the housing, it is obvious, without further illustration, that the same may be formed integral with said portion or that it may be connected therewith by means other than a screw thread.

The valve housing is secured in place on the body 4 of the injector or other apparatus with which it is associated by the use of a wrench, and it is, to this end, provided with a plurality of lugs 13 which depend from its lower surface, exteriorly of the strainer 12.

In the modified construction shown in Fig. 5, the valve is provided with a recess 9ª for the reception of a coiled spring 14, which by engagement with the top portion of the cage serves to maintain the valve in position upon its seat. This construction is particularly adapted for use on injectors in which the inlet valve moves along an inclined axis.

As the operation of my improved check valve is obvious and as it furthermore has been referred to at intervals in the foregoing description, further explanation at this point is deemed unnecessary, it being understood that variations in the form and arrangement of the parts described may be availed of within the spirit of the invention.

What I claim and desire to secure by Letters-Patent is:—

1. An intake valve for injectors comprising a hollow body-portion adapted to be secured within an injector and having at one of its ends a circular valve seat and at its opposite end a strainer, a ported cage surrounding said seat, and a stemless valve normally engaging said seat free from contact with other parts, the said cage being constructed to limit the movement of said valve.

2. An intake valve for injectors comprising a hollow body-portion adapted to be secured within an injector and having at one of its ends a circular valve seat and at its opposite end a strainer, a ported cage surrounding said seat, and a stemless valve normally supported upon said seat, free from contact with other parts and comprising a disk having at its lower surface a central enlargement spaced from the said body portion, the said cage being constructed to limit the movement of said valve.

3. An intake valve for injectors comprising a hollow, cylindrical body-portion having at its upper end an annular valve seat and at its opposite end, a strainer, a stemless valve normally supported upon said seat free from contact with other parts, and a cylindrical ported cage screwed upon the said upper end of the body portion to limit the movement of the valve, the said body portion having an exterior screw thread the diameter of which exceeds that of the said cage, whereby the device may be inserted upwardly through an opening in an injector in which it is secured.

4. An intake valve for injectors, comprising a cylindrical hollow body portion having at its upper end an annular valve seat and provided with an external screw-thread whereby it may be secured in a threaded opening through which its upper end is inserted, a stemless valve supported upon said seat free from contact with other parts, a ported cage screwed upon the upper end of the body portion to limit the movement of the valve, and a perforated cup screwed within the opposite end of the same to strain fluid before it reaches the valve.

In testimony whereof I have affixed my signature in presence of two witnesses.

MARTIN G. FRIES.

Witnesses:
L. L. RHOADES,
F. H. CUNO.

---

Copies of this patent may be obtained for five cents each, by addressing the "Commissioner of Patents, Washington, D. C."

---